United States Patent
Naito et al.

(10) Patent No.: US 10,635,080 B2
(45) Date of Patent: *Apr. 28, 2020

(54) WORK REGION ESTIMATION DEVICE, CONTROL DEVICE, CONTROL SYSTEM, WORK REGION ESTIMATION METHOD, AND NON-TRANSITORY COMPUTER-READABLE RECORDING MEDIUM

(71) Applicant: OMRON Corporation, Kyoto (JP)

(72) Inventors: Sayaka Naito, Joyo (JP); Yoshikazu Mori, Koriyama (JP); Kazuki Kasai, Tokyo (JP); Osamu Nishizaki, Kitakaturagi-gun (JP)

(73) Assignee: OMRON Corporation, Kyoto (JP)

( * ) Notice: Subject to any disclaimer, the term of this patent is extended or adjusted under 35 U.S.C. 154(b) by 138 days.

This patent is subject to a terminal disclaimer.

(21) Appl. No.: 15/750,845

(22) PCT Filed: Jan. 10, 2017

(86) PCT No.: PCT/JP2017/000393
§ 371 (c)(1),
(2) Date: Feb. 7, 2018

(87) PCT Pub. No.: WO2017/141568
PCT Pub. Date: Aug. 24, 2017

(65) Prior Publication Data
US 2018/0231955 A1    Aug. 16, 2018

(30) Foreign Application Priority Data
Feb. 15, 2016 (JP) .................... 2016-025960

(51) Int. Cl.
*G05B 19/4061* (2006.01)
*B62D 65/18* (2006.01)
*B25J 9/16* (2006.01)

(52) U.S. Cl.
CPC ........ *G05B 19/4061* (2013.01); *B25J 9/1676* (2013.01); *G05B 2219/39082* (2013.01);
(Continued)

(58) Field of Classification Search
CPC .......... G05B 19/4061; G05B 19/41865; B62D 65/18; G06Q 10/06311
See application file for complete search history.

(56) References Cited

U.S. PATENT DOCUMENTS

| | | | |
|---|---|---|---|
| 2011/0050878 A1* | 3/2011 | Wells .................... | H04N 7/181 348/86 |
| 2012/0279285 A1* | 11/2012 | Kato ...................... | B21D 5/02 73/65.01 |

(Continued)

FOREIGN PATENT DOCUMENTS

| CN | 103052455 | 4/2013 |
|---|---|---|
| CN | 104428107 | 3/2015 |

(Continued)

OTHER PUBLICATIONS

"International Search Report (Form PCT/ISA/210) of PCT/JP2017/000393", dated Apr. 18, 2017, with English translation thereof, pp. 1-3.

(Continued)

*Primary Examiner* — Ronald D Hartman, Jr.
(74) *Attorney, Agent, or Firm* — JCIPRNET

(57) ABSTRACT

This work region estimation device, which estimates a region in which a worker performs work, is provided with an orientation acquisition unit that acquires worker orientation information, and a work region calculation unit that, on the basis of the orientation information and a worker body model, calculates a region in which a worker operation is forecast.

17 Claims, 3 Drawing Sheets

(52) U.S. Cl.
CPC ........... *G05B 2219/40202* (2013.01); *G05B 2219/40203* (2013.01); *G05B 2219/40339* (2013.01); *G05B 2219/49143* (2013.01); *G05B 2219/50193* (2013.01)

(56) References Cited

U.S. PATENT DOCUMENTS

| | | | |
|---|---|---|---|
| 2014/0163424 A1* | 6/2014 | Kawaguchi | A61B 5/0077 600/595 |
| 2015/0158178 A1 | 6/2015 | Burmeister et al. | |
| 2015/0228078 A1* | 8/2015 | Zahand | G06K 9/00771 382/103 |

FOREIGN PATENT DOCUMENTS

| | | |
|---|---|---|
| DE | 202013105036 | 2/2015 |
| JP | H10-240791 | 9/1998 |
| JP | 2004-230541 | 8/2004 |
| JP | 2006-43862 | 2/2006 |
| JP | 4219870 | 2/2009 |
| JP | 2015-58167 | 3/2015 |
| KR | 20150121403 | 10/2015 |

OTHER PUBLICATIONS

"Written Opinion of the International Searching Authority (Form PCT/ISA/237) of PCT/JP2017/000393", dated Apr. 18, 2017, with English translation thereof, pp. 1-10.

"Search Report of Europe Counterpart Application", dated Sep. 18, 2019, pp. 1-10.

J. A. Corrales et al., "Cooperative Tasks between Humans and Robots in Industrial Environments," International Journal of Advanced Robotic Systems, vol. 9, No. 3, Jan. 1, 2012, pp. 1-10.

Jim Mainprice et al., "Human-robot collaborative manipulation planning using early prediction of human motion," 2013 IEEE/RSJ International Conference on Intelligent Robots and Systems, Nov. 3-7, 2013, pp. 299-306.

"Office Action of China Counterpart Application," with English translation thereof, dated Nov. 20, 2019, p1-p24.

\* cited by examiner

WORK REGION ESTIMATION DEVICE, CONTROL DEVICE, CONTROL SYSTEM, WORK REGION ESTIMATION METHOD, AND NON-TRANSITORY COMPUTER-READABLE RECORDING MEDIUM

CROSS-REFERENCE TO RELATED APPLICATION

This application is a 371 of international application of PCT application serial no. PCT/JP2017/000393, filed on Jan. 10, 2017, which claims the priority benefit of Japan application no. 2016-025960, filed on Feb. 15, 2016. The entirety of each of the above-mentioned patent applications is hereby incorporated by reference herein and made a part of this specification.

TECHNICAL FIELD

The present invention relates to a work region estimation device, a control device, a control system, a work region estimation method, and a program.

BACKGROUND ART

In the related art, a factory production line is known (e.g., refer to Patent Literature 1).

The production line disclosed in Patent Literature 1 is used in vehicle assembly processes and the like, and includes a vehicle conveyor that transports vehicles, a worker conveyor that helps a worker move in a vehicle transport orientation, a controller that controls the worker conveyor, and a sensor that is mounted on a worker. The sensor has a function of detecting an orientation and movement acceleration of a worker. In addition, the controller is designed to control an operation orientation and an operation speed of the worker conveyor in accordance with an orientation and movement acceleration of a worker. Accordingly, workers are seldom forced to walk to move, and thus workers' fatigue caused by walking can be reduced.

CITATION LIST

Patent Literature

[Patent Literature 1]
Japanese Unexamined Patent Application Publication No. 2004-230541

SUMMARY OF INVENTION

Technical Problem

Here, it is desirable in a production line of a factory and the like to estimate a region in which a worker performs work in a situation in which a worker performs work with industrial machines. For example, if it is possible to estimate a region in which a worker performs work, a work region of an industrial machine can be widened while an impeditive situation of a worker (an operation of an industrial machine and an operation of a worker interfere with each other) is prevented, and therefore, productivity can be improved while safety is assured.

The present invention has been conceived to solve the above-described problem, and aims to provide a work region estimation device, a control device, a control system, a work region estimation method, and a program that enable a region in which a worker performs work to be estimated.

Solution to Problem

A work region estimation device according to the present invention estimates a region in which a worker performs work, and includes an orientation acquisition unit that acquires orientation information of the worker, and a work region calculation unit that calculates a region in which a worker operation is forecast on the basis of the orientation information and a worker body model of the worker.

With the above-described configuration, a region in which an operation is forecast can be estimated on the basis of the orientation information that reflects an intention of the worker, and a region in which the worker performs work can be estimated with high accuracy.

The work region estimation device includes a movable range calculation unit that calculates a movable range of the worker on the basis of the orientation information and the worker body model, and the work region calculation unit calculates a region in which a worker operation is forecast on the basis of the movable range.

In the work region estimation device, the orientation information includes orientation information of the torso of the worker and orientation information of the head of the worker, and the work region calculation unit performs weighted evaluation of an operability in a region in which a worker operation is forecast on the basis of the orientation information of the torso and the orientation information of the head.

The work region estimation device may include a state acquisition unit that acquires at least one of position information and attitude information of a worker.

In the work region estimation device that includes the state acquisition unit, the state acquisition unit may acquire at least one of acceleration data, angular velocity data, speed data, angular acceleration data, pressure data, and magnetism data, and calculate at least one of the position information and the attitude information using the acquired data.

In the work region estimation device that includes the state acquisition unit, the orientation acquisition unit may calculate the orientation information on the basis of at least one of the position information and the attitude information, and the worker body model.

The work region estimation device that includes the state acquisition unit may include a worker body model calculation unit that calculates the worker body model using at least one of the position information and the attitude information.

The work region estimation device may include a worker body model recording unit that records the worker body model.

A control device according to the present invention includes the work region estimation device, and a control unit that controls a control target.

In the control device, the control unit may cause the control target to operate outside a region in which a worker operation is forecast.

In the control device, the orientation information may include orientation information of the torso of a worker and orientation information of the head of the worker, the work region calculation unit may perform weighted evaluation of an operability in a region in which a worker operation is forecast on the basis of the orientation information of the torso and the orientation information of the head, and the control unit may cause a control target to operate outside a region that gives an operability having a value higher than or equal to a predetermined value. Note that the predetermined value is, for example, a pre-set value and a boundary value that helps determine high operability.

A control system according to the present invention includes the control device and a detection device mounted on a worker.

In the control system, the detection device may detect at least one of acceleration data, angular velocity data, speed data, angular acceleration data, pressure data, and magnetism data, the work region estimation device may include a state acquisition unit that acquires at least one of position information and attitude information of the worker, and the state acquisition unit may acquire a detection result of the detection device, and calculate at least one of the position information and the attitude information using the acquired detection result.

A work region estimation method according to the present invention is for estimating a region in which a worker performs work, and the method includes a step of acquiring orientation information of the worker, and a step of calculating a region in which a worker operation is forecast on the basis of the orientation information and a worker body model of the worker.

A program according to the present invention may cause a computer to execute the work region estimation method.

Advantageous Effects of Invention

According to the work region estimation device, the control device, the control system, the work region estimation method, and the program of the present invention, a region in which a worker performs work can be estimated.

DESCRIPTION OF EMBODIMENTS

An embodiment of the present invention will be described below with reference to the drawings.

First, a configuration of a control system 100 according to an embodiment of the present invention will be described with reference to FIG. 1 and FIG. 2.

Figure 1:
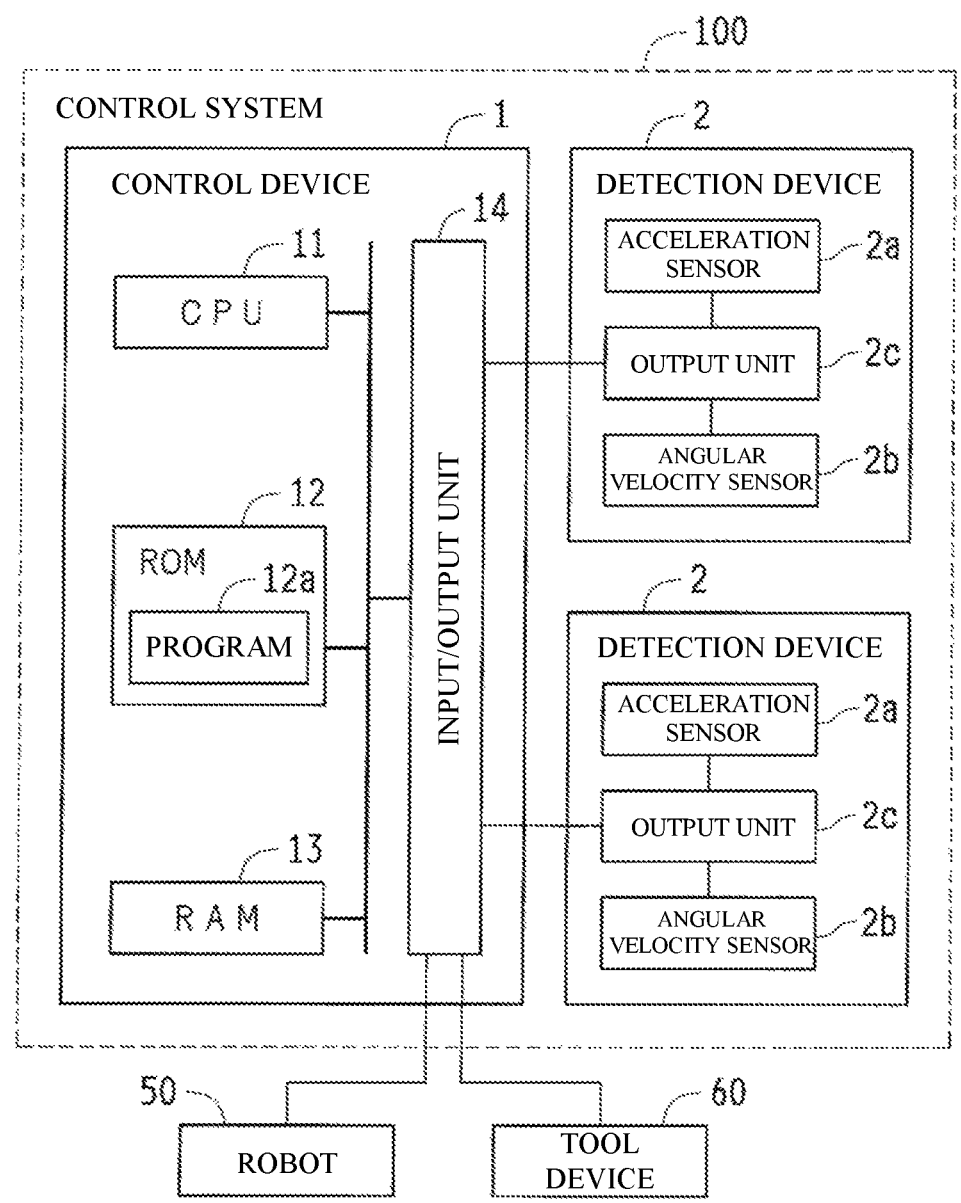
FIG. 1 is a hardware block diagram showing a configuration of a control system according to an embodiment of the present invention.

The control system 100 includes a control device 1 that controls a robot 50 and detection devices 2 mounted on a worker as shown in FIG. 1. The control system 100 estimates a work region (a region in which an operation is forecast) of a worker on, for example, a production line of a factory or the like and controls the robot 50 in accordance with the work region of the worker. Note that the robot 50 is, for example, a robot arm installed on a production line of a factory or the like, and is an example of a "control target" of the present invention.

The detection devices 2 are each attached to portions of a worker, and each of the detection devices 2 is provided to detect an operation of the portion to which the detection device is attached. Note that, although two detection devices 2 are shown in FIG. 1, a number of detection devices 2 may be provided to detect operations of the entire body of a worker. Examples of positions on the body of the worker at which the detection devices 2 can be attached include the head, the shoulders, the arms (an upper arm, a lower arm, the hands), the back, the waist, and the legs (thighs, shins, feet).

Each of the detection devices 2 includes an acceleration sensor 2a that detects acceleration data, an angular velocity sensor 2b that detects angular velocity data, and an output unit 2c that outputs detection results of the acceleration sensor 2a and the angular velocity sensor 2b to the control device 1. Note that, although the detection devices 2 here are wirelessly connected to the control device 1, for example, the detection devices may be connected to the control device 1 with wires.

The control device 1 acquires orientation information of a worker and estimates a work region of the worker on the basis of the orientation information and a worker body model. In addition, the control device 1 estimates a region with high operability within a work region on the basis of the orientation information (orientation information of the torso and the head) of a worker. Furthermore, the control device 1 may cause the robot 50 to operate outside the region with high operability for the worker. Note that the worker body model of the worker is, for example, a database of dimensions of each portion of the body of the worker.

The control device 1 includes a CPU 11, a ROM 12, a RAM 13, and an input/output unit 14. The CPU 11 executes arithmetic processing on the basis of a program 12a stored in the ROM 12, and the like. The ROM 12 is a non-volatile memory, and stores the program 12a, set values used in execution of the program 12a, and the like. Note that the program 12a includes a control program of the robot 50 and the like. The RAM 13 is a volatile memory, and has a function of temporarily storing arithmetic operation results of the CPU 11, detection results of the detection devices 2, and the like. The input/output unit 14 is connected to the plurality of detection devices 2, the robot 50, and a tool device 60 for changing settings of the control device 1, and the like.

Figure 2:
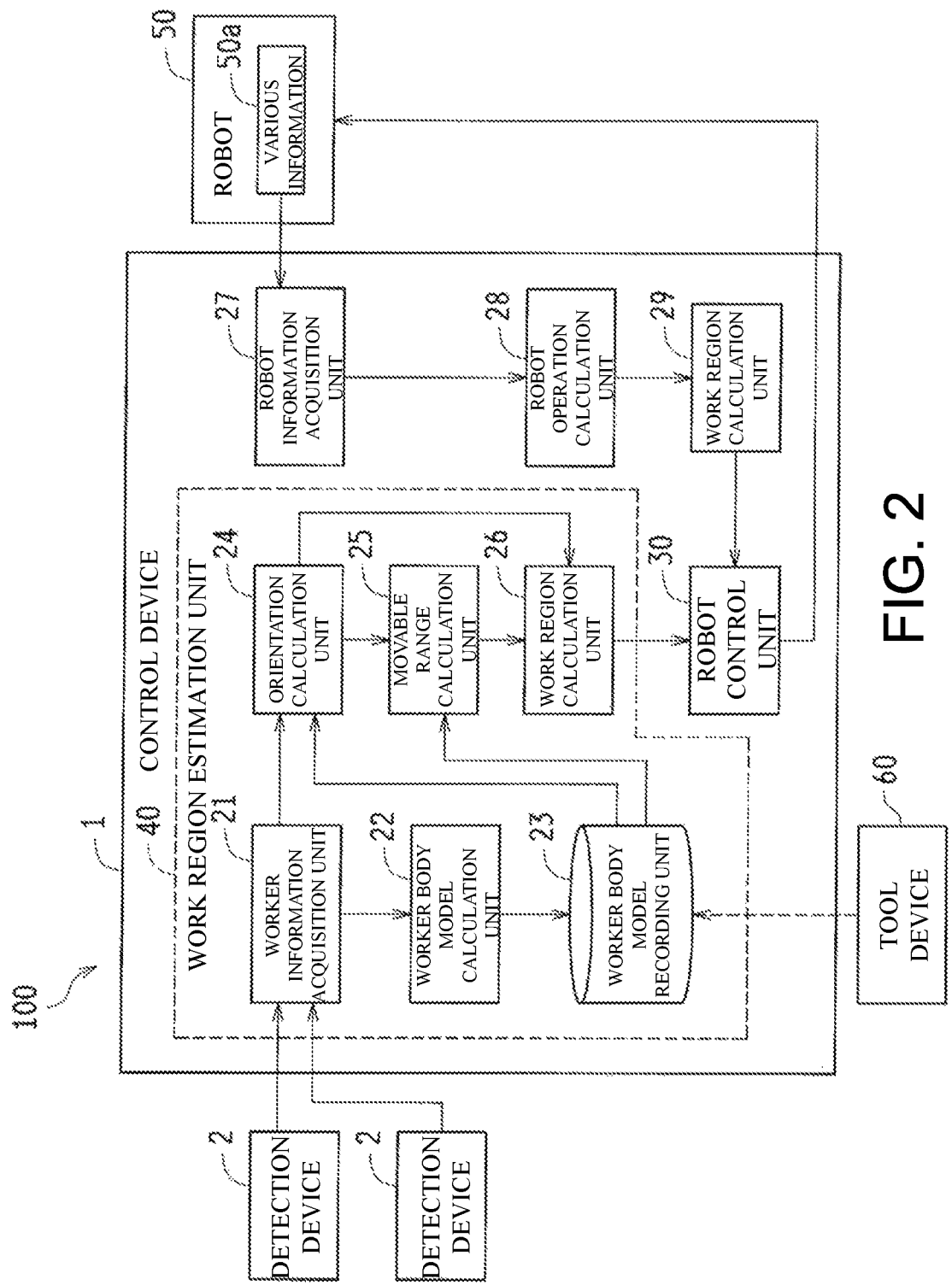
FIG. 2 is a function block diagram of a control device included in the control system of FIG. 1.

In addition, the control device 1 includes a worker information acquisition unit 21, a worker body model calculation unit 22, a worker body model recording unit 23, an orientation calculation unit 24, a movable range calculation unit 25, a work region calculation unit 26 for a worker, a robot information acquisition unit 27, a robot operation calculation unit 28, a work region calculation unit 29 for the robot 50, and a robot control unit 30 as shown in FIG. 2. Note that the worker information acquisition unit 21, the worker body model calculation unit 22, the orientation calculation unit 24, the movable range calculation unit 25, the work region calculation unit 26, the robot information acquisition unit 27, the robot operation calculation unit 28, the work region calculation unit 29, and the robot control unit 30 are realized by the CPU 11 executing the program 12a. In addition, the worker body model recording unit 23 is configured with a part of a storage region of the ROM 12.

Furthermore, the worker information acquisition unit 21, the worker body model calculation unit 22, the worker body model recording unit 23, the orientation calculation unit 24, the movable range calculation unit 25, and the work region calculation unit 26 constitute a work region estimation unit 40 that estimates a work region of a worker. Note that the work region estimation unit 40 is an example of a "work region estimation device" of the present invention.

The worker information acquisition unit 21 receives inputs of detection results of each of the detection devices 2. That is, the worker information acquisition unit 21 acquires acceleration data and angular velocity data of each portion of a worker in accordance with time. In addition, the worker information acquisition unit 21 calculates position information and attitude information using the acceleration data and the angular velocity data. That is, the worker information acquisition unit 21 acquires position information and attitude information regarding each portion of a worker in accordance with time. Note that the position information is, for example, coordinate values of a three-dimensional coordinate system, and the attitude information is, for example, a rotation angle with respect to each coordinate axis. In addition, the worker information acquisition unit 21 is an example of a "state acquisition unit" of the present invention.

The worker body model calculation unit 22 is provided to calculate a worker body model of a worker on the basis of the position information and the attitude information acquired by the worker information acquisition unit 21. The worker body model calculation unit 22 generates a worker body model by calculating a dimension of each portion of a worker using temporal changes of the position information and the attitude information of the portion of the worker. Note that the worker may be prompted to make a predetermined operation when the worker body model calculation unit 22 calculates a worker body model.

The worker body model recording unit 23 records the worker body model of the worker. The worker body model recording unit 23 may record the worker body model that is the calculation result of the worker body model calculation unit 22, or may record a worker body model input by a worker using the tool device 60. That is, the worker body model recording unit 23 has two worker body model recording methods, and may perform recording using either of the methods in the present embodiment.

The orientation calculation unit 24 is provided to calculate orientation information of the worker on the basis of the position information and attitude information acquired by the worker information acquisition unit 21, and the worker body model recorded in the worker body model recording unit 23. The orientation information includes, for example, orientation information of the torso of the worker and orientation information of the head of the worker. Note that the orientation of the torso is, for example, the direction which the front side of the torso faces, and change of the orientation can be traced using temporal change of a position and an attitude thereof. Likewise, the orientation of the head is, for example, the direction that the front side of the head faces, and change of the orientation can be traced using temporal change of a position and an attitude thereof. Note that the orientation calculation unit 24 is an example of an "orientation acquisition unit" of the present invention.

The movable range calculation unit 25 is provided to calculate a movable range of the worker. The movable range calculation unit 25 calculates a movable range of the worker on the basis of the orientation information of the worker calculated by the orientation calculation unit 24 and the worker body model recorded in the worker body model recording unit 23. Note that the movable range is a predetermined region surrounding the periphery of the worker, in which the worker can move his or her body from a current state. When the shoulders of the worker are fixed, for example, the movable range of his or her arms is the range which the worker can reach with his or her arms stretched.

The work region calculation unit 26 is provided to calculate a work region of the worker and estimates a region with high operability within the work region. For example, the work region calculation unit 26 estimates a movable range calculated by the movable range calculation unit 25 as a work region. In addition, the work region calculation unit 26 performs weighted evaluation of the operability in the work region on the basis of the orientation information (the orientation information of the torso and the head) of the worker calculated by the orientation calculation unit 24. Furthermore, the work region calculation unit 26 estimates a region having a weighted value (operability) higher than or equal to a predetermined value as a region giving high operability. Note that the predetermined value is, for example, a pre-set value and a boundary value that helps determine high operability. To describe a specific example of the weighting evaluation, since a worker has a high likelihood of working in a region located on a side in a direction that his or her head faces, a weighted value of this region is set to be high, and weighted values of regions are set to decrease as regions become farther from this region.

The robot information acquisition unit 27 receives an input of various information 50a from the robot 50. The various information 50a includes, for example, position information, speed information, acceleration information, route information, and the like of the robot 50, and is detected using sensors (which are not illustrated) provided in the robot 50.

The robot operation calculation unit 28 is provided to calculate operation information of the robot 50. The robot operation calculation unit 28 calculates operation information of the robot 50 on the basis of, for example, the various information 50a acquired by the robot information acquisition unit 27 and the control program for controlling the robot 50.

The work region calculation unit 29 is provided to calculate a work region of the robot 50 (a region in which an operation is forecast). The work region calculation unit 29 calculates a work region of the robot 50 on the basis of, for example, a calculation result of the robot operation calculation unit 28.

The robot control unit 30 is provided to output an operation instruction to the robot 50. The robot control unit 30 causes the robot 50 to operate outside a region with high operability by prohibiting the robot 50 from advancing into the region with high operability within a work region of the worker. For example, when a region with high operability for the worker and the work region of the robot 50 do not interfere with (do not overlap) each other, the robot control unit 30 causes the robot 50 to operate on the basis of the control program, and when the region with high operability for the worker and the work region of the robot 50 interfere with (overlap) each other, the robot control unit 30 causes the robot 50 to stop and not to advance into the region with high operability for the worker. Note that the robot control unit 30 is an example of a "control unit" of the present invention.

—Operation of Control System—

Next, an operation of the control system 100 according to the present embodiment will be described with reference to FIG. 3. A work region estimation method used by the control device 1 is included in the operation.

Note that the following steps are performed when the CPU 11 (refer to FIG. 1) executes the program 12a (refer to FIG. 1). That is, the program 12a is for causing the control device 1 (refer to FIG. 1) to execute the following steps, and is stored in the ROM 12 (refer to FIG. 1) that is a readable recording medium of the control device 1.

In addition, the worker body model of a worker is recorded in the worker body model recording unit 23 (refer to FIG. 2) in advance. The worker body model may be recorded by the worker body model calculation unit 22 (refer to FIG. 2), or may be recorded using the tool device 60 (refer to FIG. 2). In addition, the detection devices 2 are mounted in each of portions of the worker.

Figure 3:
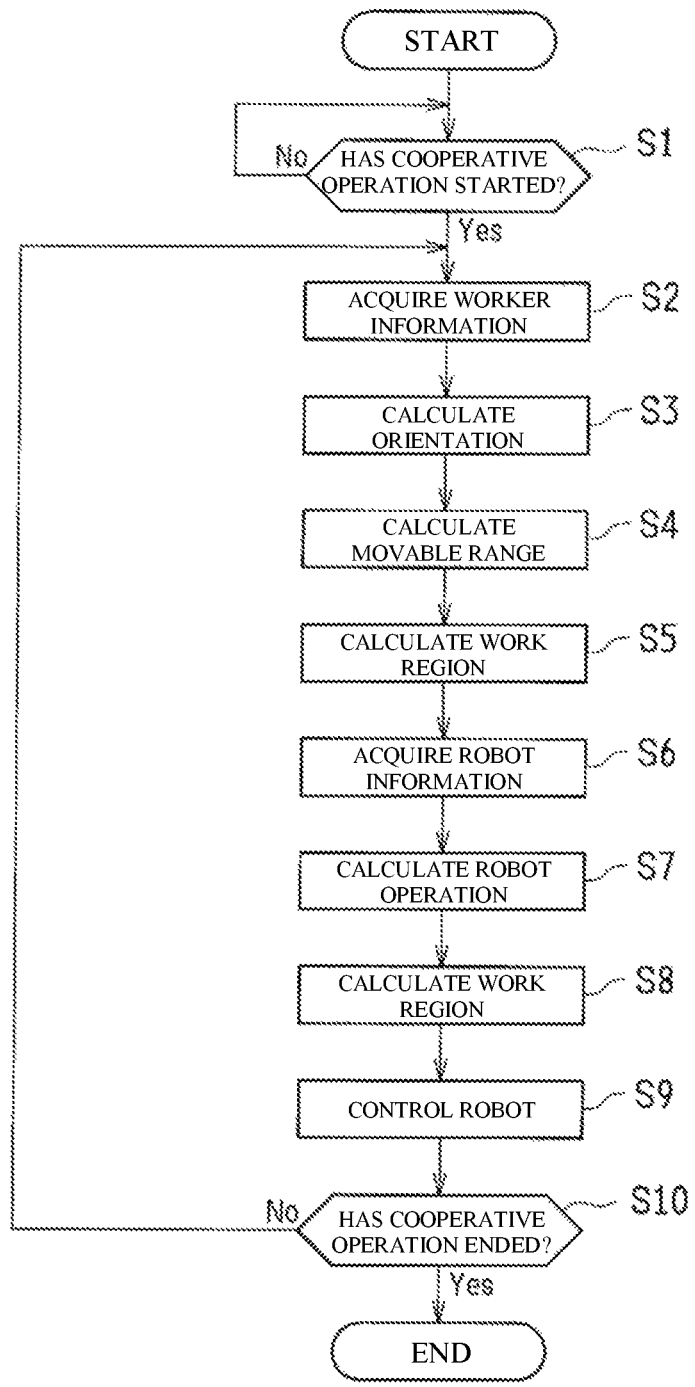
FIG. 3 is a flowchart for describing an operation of the control system of the embodiment.

First, in Step S1 of FIG. 3, it is determined whether a cooperative operation of the worker and the robot 50 (refer to FIG. 2) has started. It is determined that a cooperative operation has started, for example, when the worker manipulates a start button (which is not illustrated). Then, if it is determined that a cooperative operation has started, the process proceeds to Step S2. On the other hand, it is determined that a cooperative operation has not started, Step S1 is repeated. That is, the control device 1 stands by until a cooperative operation starts.

Next, in Step S2, the worker information acquisition unit 21 (refer to FIG. 2) acquires position information and attitude information of each portion of the worker. Specifically, position information and attitude information of each portion are calculated on the basis of acceleration data and angular velocity data input from each of the detection devices 2.

Next, in Step S3, the orientation calculation unit 24 (refer to FIG. 2) calculates orientation information of the worker. Specifically, orientation information of the torso and the head of the worker is calculated on the basis of the position information and the attitude information of the worker and the worker body model recorded in the worker body model recording unit 23.

Next, in Step S4, the movable range calculation unit 25 (refer to FIG. 2) calculates a movable range of the worker. Specifically, a movable range of the worker is calculated on the basis of the orientation information and the worker body model of the worker.

Next, in Step S5, the work region calculation unit 26 (refer to FIG. 2) calculates a work region of the worker and estimates a region with high operability within the work region. Specifically, a movable range is estimated as the work region. In addition, weighted evaluation is performed on the operability in the work region on the basis of orientation information of the torso and the head of the worker. For example, a weighted value of a region located on a side in a direction that his or her head faces may be set to be high, and weighted values of regions may be set to decrease as regions become farther from this region. In this case, a region having a weighted value higher than or equal to a predetermined value is estimated to be a region giving high operability.

Next, in Step S6, the robot information acquisition unit 27 (refer to FIG. 2) acquires the various information 50a (refer to FIG. 2) of the robot 50. Then, in Step S7, the robot operation calculation unit 28 (refer to FIG. 2) calculates operation information of the robot 50. Thereafter, in Step S8, the work region calculation unit 29 (refer to FIG. 2) calculates a work region of the robot 50.

Next, in Step S9, the robot control unit 30 (refer to FIG. 2) controls the robot 50. The robot control unit 30 causes the robot 50 to operate outside a region with high operability for the worker. Specifically, it is determined whether the region with high operability for the worker and the work region of the robot 50 interfere with each other on the basis of the region with high operability for the worker calculated in Step S5 and the work region of the robot 50 calculated in Step S8. Then, when it is determined that the region with high operability for the worker and the work region of the robot 50 do not interfere with each other, the robot 50 is caused to operate on the basis of the control program. On the other hand, when it is determined that the region with high operability for the worker and the work region of the robot 50 interfere with each other, the robot 50 is stopped, for example, to prevent an advance of the robot 50 into the region with high operability for the worker.

Next, in Step S10, it is determined whether a cooperative operation of the worker and the robot 50 has ended. When the worker manipulates an end button (which is not illustrated), for example, it is determined that the cooperative operation has ended. In addition, when it is determined that the cooperative operation has ended, the process proceeds to an end step. On the other hand, when it is determined that the cooperative operation has not ended, the process returns to Step S2.

—Effects—

In the present embodiment, the orientation calculation unit 24 that calculates orientation information of a worker, the movable range calculation unit 25 that calculates a movable range of the worker on the basis of the orientation information and a worker body model, the work region calculation unit 26 that calculates a work region of the worker on the basis of the movable range are provided as described above. With this configuration, a work region is estimated on the basis of the orientation information that is information in which an intention of the worker is reflected, and thus the work region of the worker can be estimated with high accuracy.

In addition, in the present embodiment, the work region calculation unit 26 estimates a region with high operability within the work region on the basis of the orientation information and includes the robot control unit 30 that causes the robot 50 to operate outside the region with high operability for the worker. With this configuration, the robot 50 can be prevented from colliding with the worker when the robot 50 performs a cooperative work with the worker, and thus safety can be improved. In addition, since the robot 50 can be allowed to come in close to a limit of the worker, the work region of the robot 50 can be widened, and thus productivity can be improved.

—Other Embodiments—

Note that all aspects of the embodiment disclosed above are merely examples, and are not a basis of limited interpretation. Thus, the technical scope of the present invention is not to be interpreted only on the basis of the above-described embodiment, and is defined on the basis of the claims. In addition, the technical scope of the present invention includes meanings equivalent to the claims and all modifications able to be made within the claims.

For example, although the example in which the robot 50 is a robot arm has been described in the present embodiment, the invention is not limited thereto, and the control target may be a transport device that transports components or the like. That is, the control target may be, for example, an industrial machine.

In addition, although the example in which a plurality of detection devices 2 detect operations of the entire body of the worker has been described in the present embodiment, the invention is not limited thereto, and only operations of a section (e.g., the upper body) of a worker may be detected.

Furthermore, although the example in which the CPU 11 executes the program 12a to realize the worker information acquisition unit 21, the worker body model calculation unit 22, the orientation calculation unit 24, the movable range calculation unit 25, the work region calculation unit 26 for a worker, the robot information acquisition unit 27, the robot operation calculation unit 28, the work region calculation unit 29 for the robot 50, and the robot control unit 30 has been described in the present embodiment, the invention is not limited thereto, and each of the worker information acquisition unit, the worker body model calculation unit, the orientation calculation unit, the movable range calculation unit, the work region calculation unit for a worker, the robot information acquisition unit, the robot operation calculation unit, the work region calculation unit for a robot, and the robot control unit may be configured as hardware.

In addition, although the example in which the position information and the attitude information are calculated on the basis of the acceleration data and the angular velocity data has been described in the present embodiment, the invention is not limited thereto, and position information and the attitude information may be calculated on the basis of speed data, angular acceleration data, pressure data, magnetism data and the like. That is, although the example in which the detection devices 2 detect acceleration data and angular velocity data has been described, the invention is not limited thereto, and the detection devices may detect at least one of acceleration data, angular velocity data, speed data, angular acceleration data, pressure data, and magnetism data.

Furthermore, although the example in which the worker information acquisition unit 21 acquires the acceleration data and the angular velocity data and calculates the position information and the attitude information using the acceleration data and the angular velocity data has been described in the present embodiment, the invention is not limited thereto, and the worker information acquisition unit may acquire at least one of acceleration data, angular velocity data, speed data, angular acceleration data, pressure data, and magnetism data, and may calculate at least one of position information and attitude information using the acquired data.

In addition, although the example in which the worker body model calculation unit 22 calculates the worker body model of the worker on the basis of the position information and the attitude information has been described in the present embodiment, the invention is not limited thereto, and the worker body model calculation unit may calculate the worker body model of the worker on the basis of the position information or the attitude information.

Furthermore, although the example in which the control device 1 has the worker body model calculation unit 22 and the tool device 60 can input the worker body model thereto has been described in the present embodiment, the invention is not limited thereto, and the tool device 60 may be set not to input the worker body model if the worker body model calculation unit 22 is provided, and if the tool device 60 can input the worker body model, the worker body model calculation unit 22 may not be provided.

In addition, although the example in which the worker body model recording unit 23 is provided has been described in the present embodiment, the invention is not limited thereto, and if the worker body model of the worker can be acquired from outside, the worker body model recording unit may not be provided.

Furthermore, although the example in which the orientation calculation unit 24 calculates the orientation information of the worker on the basis of the position information, the attitude information, and the worker body model of the worker has been described in the present embodiment, the invention is not limited thereto, and the orientation calculation unit may calculate orientation information of the worker on the basis of the position information or the attitude information, and the worker body model of the worker, or may calculate the orientation information of the worker on the basis of at least one of the position information and the attitude information, regardless of the worker body model. In addition, if the orientation acquisition unit that acquires orientation information of a worker is pro-vided, the orientation calculation unit and the worker information acquisition unit may not be provided.

In addition, although the example in which the orientation calculation unit 24 calculates the orientation information of the torso of the worker and the orientation information of the head of the worker has been described in the present embodiment, the invention is not limited thereto, and the orientation calculation unit may calculate only orientation information of the torso of a worker.

Furthermore, although the example in which the movable range calculation unit 25 is provided has been described in the present embodiment, the invention is not limited thereto, and the movable range calculation unit may not be provided. In that case, the work region calculation unit may estimate a work region on the basis of orientation information and a worker body model of a worker.

In addition, although the example in which the work region calculation unit 26 estimates the movable range as a work region has been described in the present embodiment, the invention is not limited thereto, and the work region calculation unit may estimate a wide region in a pre-set range of the movable range as a work region, or may estimate a narrow region in a pre-set range of the movable range as a work region.

In addition, although the example in which the work region calculation unit 26 estimates the region with high operability within the work region has been described in the present embodiment, the invention is not limited thereto, and the work region calculation unit may not estimate a region with high operability within a work region. In this case, the robot control unit may cause the robot to operate outside the work region of the worker.

Furthermore, although the example in which the robot operation calculation unit 28 and the work region calculation unit 29 are provided has been described in the present embodiment, the invention is not limited thereto, and the robot operation calculation unit and the work region calculation unit may not be provided when operation information and a work region of the robot are recorded in the ROM of the control device in advance. In this case, Steps S7 and S8 may be omitted from the flowchart of FIG. 3.

In addition, although the example in which the control program of the robot 50 is recorded in the ROM 12 of the control device 1 has been described in the present embodiment, the invention is not limited thereto, and the control program of the robot may not be recorded in the ROM of the control device. That is, the control device may prohibit a robot that autonomously operates from advancing into a region with high operability for a worker. In this case, operation information is calculated using various information of the robot, a work region of the robot is calculated, and a stop instruction may be output to the robot when a region with high operability for the worker and a work region of the robot interfere with each other.

Furthermore, although the example in which the robot control unit 30 stops the robot 50 when the region with high operability for the worker and the work region of the robot 50 interfere with each other the has been described in the present embodiment, the invention is not limited thereto, and when the region with high operability for the worker and the work region of the robot interfere with each other, the robot may be caused to perform other types of work outside the region with high operability for the worker.

In addition, although the example in which the cooperative operation is determined to have started when the start button is manipulated has been described in the present embodiment, the invention is not limited thereto, and the cooperative operation may be determined to have started when the worker advances into a predetermined section. Likewise, although the example in which the cooperative operation is determined to have ended when the end button is manipulated has been described, the invention is not limited thereto, and the cooperative operation may be determined to have ended when the worker retreats from a predetermined section.

Furthermore, although the example in which the work region of the robot 50 is calculated after the work region of the worker is calculated has been described in the flowchart of the present embodiment, the invention is not limited thereto, and a work region of a worker and a work region of the robot may be calculated at the same time, or a work region of the worker may be calculated after a work region of the robot is calculated. That is, the flowchart of FIG. 3 is merely an example and there is no limitation to this procedure.

INDUSTRIAL APPLICABILITY

The present invention can be applied to a work region estimation device, a control device, a control system, a work region estimation method, and a program.

REFERENCE SIGNS LIST

- 1 Control device (computer)
- 2 Detection device
- 12*a* Program
- 21 Worker information acquisition unit (state acquisition unit)
- 22 Worker body model calculation unit
- 23 Worker body model recording unit
- 24 Orientation calculation unit (orientation acquisition unit)
- 25 Movable range calculation unit
- 26 Work region calculation unit
- 30 Robot control unit (control unit)
- 40 Work region estimation unit (work region estimation device)
- 50 Robot (control target)
- 100 Control system

The invention claimed is:

1. A work region estimation device that estimates a region in which a worker performs work, comprising:
an orientation acquisition unit that acquires orientation information of the worker; and
a work region calculation unit that calculates a region in which a worker operation is forecasted on the basis of the orientation information and a worker body model of the worker and performs weighted evaluation of an operability in the region in which the worker operation is forecasted on the basis of orientation information of a torso of the worker and orientation information of a head of the worker,
wherein the orientation information includes the orientation information of the torso of the worker and the orientation information of the head of the worker.

2. The work region estimation device according to claim 1, comprising:
a movable range calculation unit that calculates a movable range of the worker on the basis of the orientation information and the worker body model,
wherein the work region calculation unit calculates the region in which the worker operation is forecasted on the basis of the movable range.

3. The work region estimation device according to claim 2, comprising:
a state acquisition unit that acquires at least one of position information and attitude information of the worker.

4. The work region estimation device according to claim 1, comprising:
a state acquisition unit that acquires at least one of position information and attitude information of the worker.

5. The work region estimation device according to claim 4,
wherein the state acquisition unit acquires at least one of acceleration data, angular velocity data, speed data, angular acceleration data, pressure data, and magnetism data, and calculates at least one of the position information and the attitude information using the acquired data.

6. The work region estimation device according to claim 5,
wherein the orientation acquisition unit calculates the orientation information on the basis of at least one of the position information and the attitude information, and the worker body model.

7. The work region estimation device according to claim 5, comprising:
a worker body model calculation unit that calculates the worker body model using at least one of the position information and the attitude information.

8. The work region estimation device according to claim 4,
wherein the orientation acquisition unit calculates the orientation information on the basis of at least one of the position information and the attitude information, and the worker body model.

9. The work region estimation device according to claim 4, comprising:
a worker body model calculation unit that calculates the worker body model using at least one of the position information and the attitude information.

10. The work region estimation device according to claim 1, comprising:
a worker body model recording unit that records the worker body model.

11. A control device comprising:
the work region estimation device according to claim 1; and
a control unit that controls a control target.

12. The control device according to claim 11,
wherein the control unit causes the control target to operate outside the region in which the worker operation is forecasted.

13. The control device according to claim 11,
wherein the control unit causes the control target to operate outside a region that gives an operability having a value higher than or equal to a predetermined value.

14. A control system comprising:
the control device according to claim 11; and
a detection device mounted on the worker.

15. The control system according to claim 14,
wherein the detection device detects at least one of acceleration data, angular velocity data, speed data, angular acceleration data, pressure data, and magnetism data, wherein the work region estimation device includes a state acquisition unit that acquires at least one of position information and attitude information of the worker, and wherein the state acquisition unit acquires a detection result of the detection device, and calculates at least one of the position information and the attitude information using the acquired detection result.

16. A work region estimation method for estimating a region in which a worker performs work, comprising:

acquiring orientation information of the worker;

calculating a region in which a worker operation is forecasted on the basis of the orientation information and a worker body model of the worker; and performing weighted evaluation of an operability in the region in which the worker operation is forecasted on the basis of orientation information of a torso of the worker and orientation information of a head of the worker, wherein the orientation information includes the orientation information of the torso of the worker and the orientation information of the head of the worker.

17. A non-transitory computer-readable recording medium comprising a program for causing a computer to execute the work region estimation method according to claim 16.

* * * * *